Figure 1:
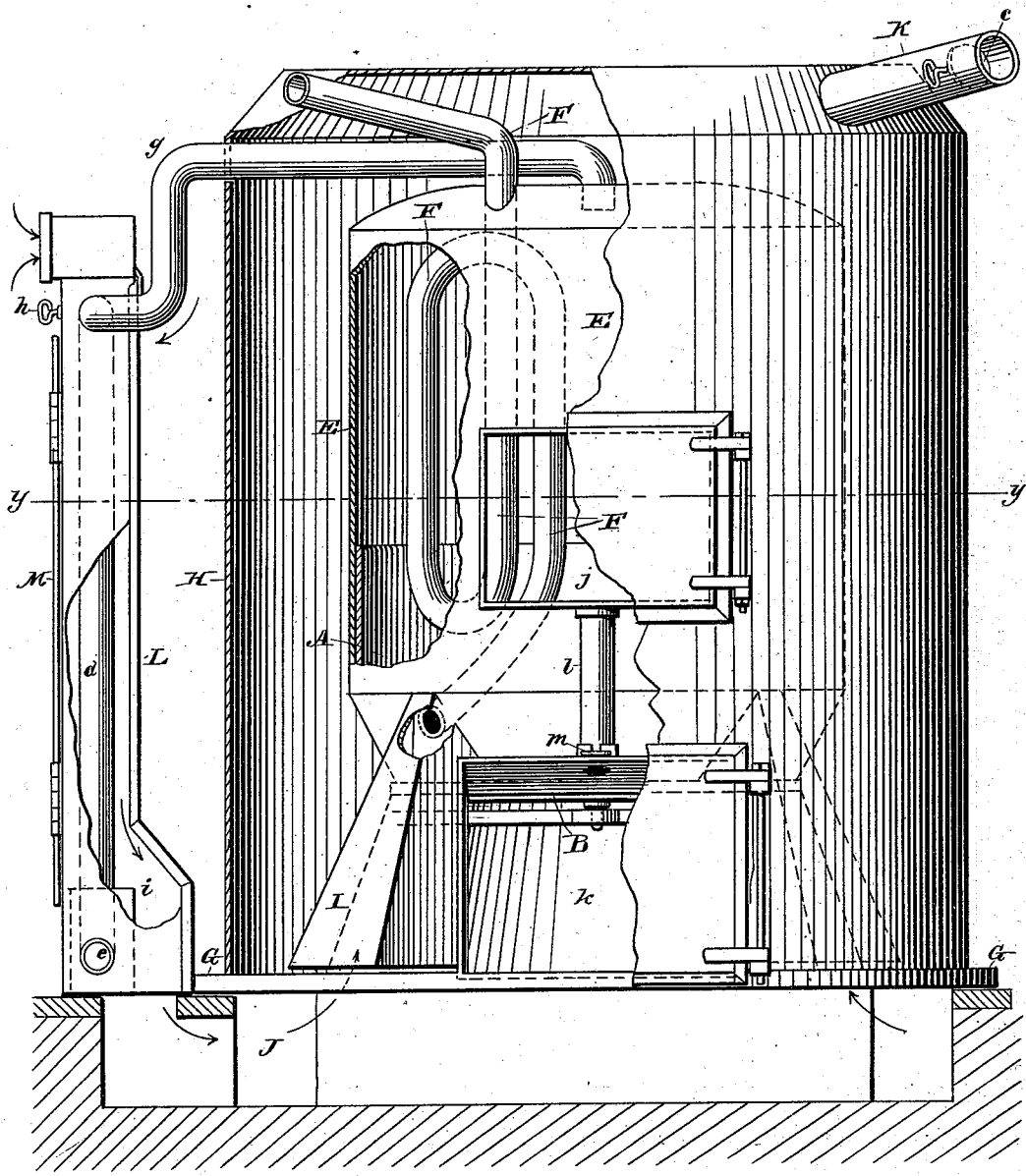

(No Model.) 3 Sheets—Sheet 1.

J. WHITE.
HEATING FURNACE.

No. 381,307. Patented Apr. 17, 1888.

WITNESSES:
George Pinkenburg
C. Sedgwick.

INVENTOR:
J. White
BY Munn & Co.
ATTORNEYS.

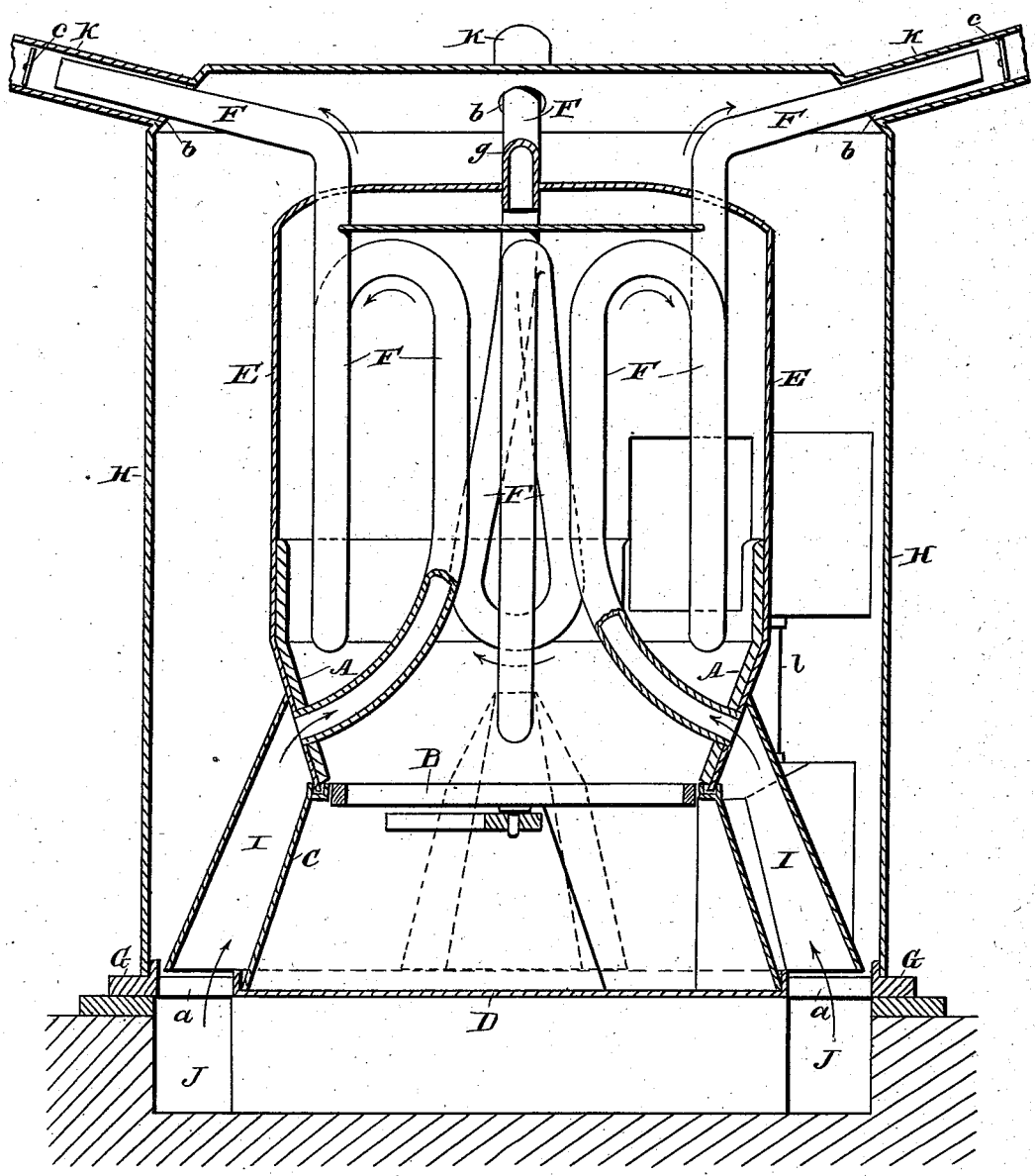

(No Model.) 3 Sheets—Sheet 3.
J. WHITE.
HEATING FURNACE.
No. 381,307. Patented Apr. 17, 1888.
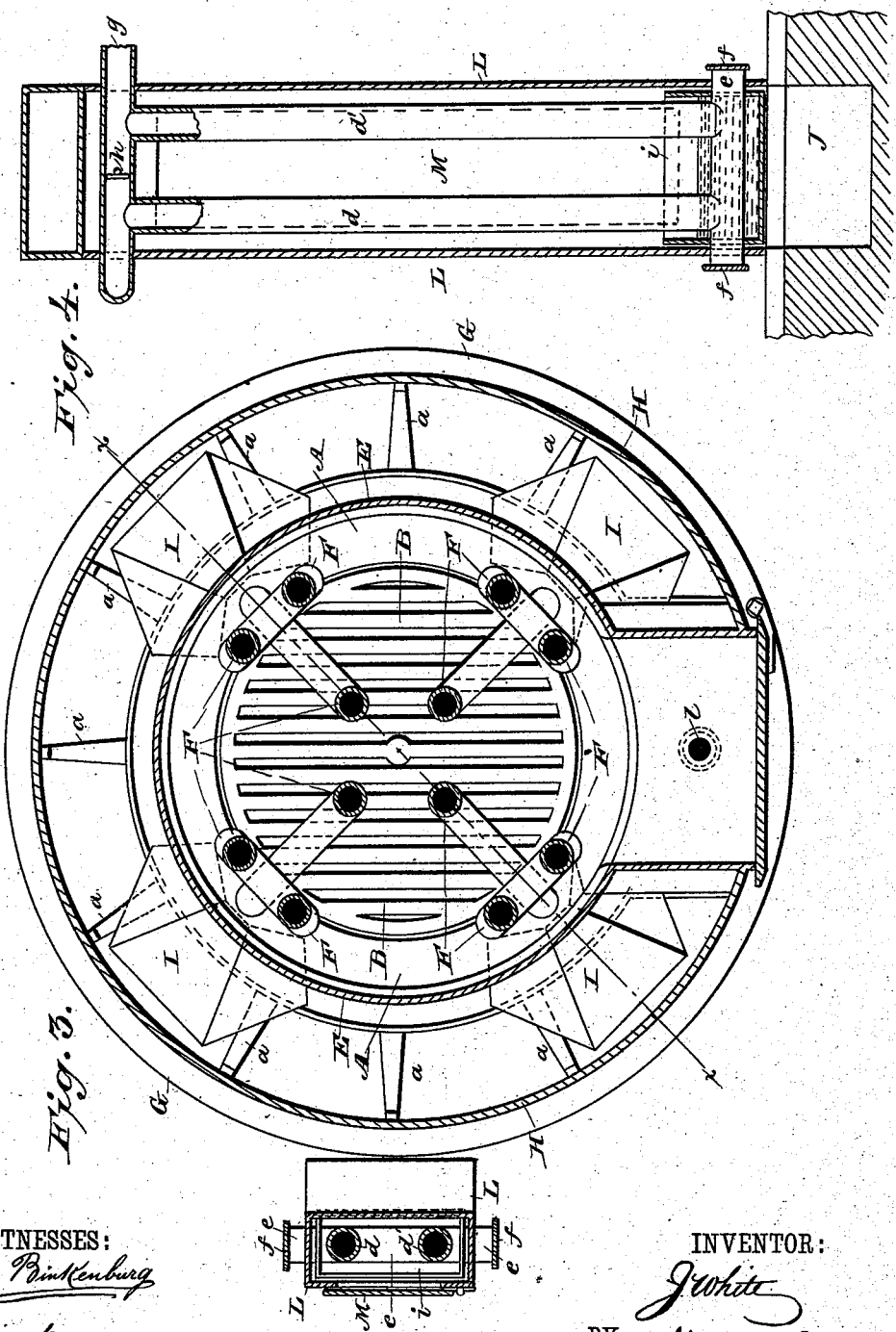
WITNESSES:
George Binkenburg
C. Sedgwick.
INVENTOR:
J. White
BY Munn & Co.
ATTORNEYS.

UNITED STATES PATENT OFFICE.

JAMES WHITE, OF BROOKLYN, NEW YORK.

HEATING-FURNACE.

SPECIFICATION forming part of Letters Patent No. 381,307, dated April 17, 1888.

Application filed May 26, 1887. Serial No. 239,418. (No model.)

*To all whom it may concern:*

Be it known that I, JAMES WHITE, of Brooklyn, in the county of Kings and State of New York, have invented a new and Improved Heating-Furnace, of which the following is a specification, reference being had to the annexed drawings, forming a part thereof, in which—

Figure 1 is a side elevation, partly in section, of my improved heating-furnace. Fig. 2 is a vertical transverse section taken on line $x\,x$ in Fig. 3. Fig. 3 is a horizontal section taken on line $y\,y$ in Fig. 1, and Fig. 4 is a side sectional elevation of a part of the cold-air duct.

Similar letters of reference indicate corresponding parts in all the figures.

The object of my invention is to construct a heating-furnace which will be capable of heating a number of rooms independently and uniformly without regard to length of air-pipe communicating with the furnace, each duct leading to an apartment having a system of its own, whereby each room is heated in substantially the same way as it would be if it had a separate furnace.

The object of my invention is, further, to economize to the greatest possible extent the heat of the fuel consumed in the furnace, and, further, to supply the requisite amount of moisture to the air delivered to the furnace for heating.

My invention consists in a furnace provided with series of separate air-ducts communicating with the air-supply and passing through return-bends, through the combustion-chamber, and out of the top of the furnace, and in the combination therewith of an air-chamber surrounding the furnace and communicating by ducts with the different apartments to be heated, the said ducts passing through the combustion-chamber of the furnace being smaller in diameter than the air-ducts leading to the different apartments, and extended into the said air-ducts to insure a positive circulation of the air in the air-ducts, and to secure for each apartment a separate heating-surface.

It also further consists in the combination, with the furnace, of an air-supply trunk containing a system of smoke-pipes partly immersed in water, whereby the air in the supply-trunk receives some of the heat of the products of combustion, and is also supplied with moisture from the water warmed by the smoke-pipe.

The body of the furnace is provided with the usual fire-pot, A, grate B, ash-pit C, and ash-pit bottom D. A combustion-chamber, E, surmounts the fire-pot A and contains a series of air-pipes, F, which enter the sides of the fire-pot, pass upward toward the top of the combustion-chamber, return downward toward the fire-pot, then extend upward through the top of the combustion chamber, and are then bent laterally. The ash-pit bottom D and the ring G, to which is fitted the air-chamber H, are preferably cast integrally in one piece with connecting-arms $a$. The air-chamber H surrounds the ash-pit C, fire-pot A, and combustion-chamber E, and extends over the top of the combustion chamber.

To the sides of the ash-pit C and fire-pot A are fitted the flaring air-conduits I, which communicate through the space J below the ash-pit bottom and with the pipes F. Between the conduits I the space J communicates with the air-chamber H. To the top of the air-chamber are fitted the air-ducts K, leading to the different apartments to be heated. The ends of the pipes F, which extend through the top of the combustion-chamber and are bent laterally, are inserted a short distance in the ducts K, and the said ducts K (being larger in diameter than the pipes F) afford an annular space, $b$, around the pipe F, through which communication is established between the air-chamber H and the portion of the duct K beyond the end of the pipe F.

To the duct K, a short distance beyond the end of the pipe F, is fitted a damper, $c$, by which the said duct K may be closed. When the damper $c$ is open, air entering the pipe F through the conduit I is strongly heated by the pipe, and ascends through the pipe to the duct K, acting as an ejector, causing the air to be withdrawn from the air-chamber H and propelled forward with the more highly-heated air from the pipes F. It will thus be seen that each duct K receives air from the air-chamber H, and also from the pipe F, and that the said pipe F acts as an independent heater for the apartments connected with the duct K.

When it is desired to stop the flow of heated air through the duct K, the damper $c$ is closed, and the air, rising through the pipe F, passes into the lower end of the duct K, and returns to the chamber H to be delivered through one of the other ducts to another apartment. By this arrangement, when the heat is shut off from the duct (in the manner described) the air is still permitted to flow through the strongly-heated pipe F, thereby preventing the said pipe from becoming injured by being overheated.

The air-space J underneath the ash-pit bottom D receives its air from the trunk L, which communicates with the external air. The trunk L contains two vertical pipes, d d', which are connected at the bottom with a horizontal pipe, e, which extends through the sides of the trunk, and is closed at opposite ends by caps f. The upper ends of the pipes d d' communicate with the smoke-pipe g, leading from the top of the combustion-chamber E transversely through the trunk. In the pipe g, between the pipes d d', is arranged a damper, h, by which the direct passage of smoke through this portion of the smoke-pipe is prevented, and by which the smoke is compelled to pass downward through the pipe d, then horizontally through the pipe e, then upward through the pipe d', to again enter the pipe g beyond the damper h. The horizontal pipe e and the lower ends of the pipes d d' are inclosed by a water-vessel, i, which contains sufficient water to cover the horizontal pipe e and surround the lower ends of the pipes d d'. The trunk L, opposite the water-vessel, is enlarged to maintain its conducting capacity at that point, and the side of the trunk L is provided with a door, M, which is opened when it is desired to fill the water-vessel i.

The fire-door passage j and the ash-pit door passage k communicate with each other by a pipe, l, provided with a damper, m. The said pipe is designed for removing the dust resulting from shaking the fire or allowing the draft to draw the dust upward into the combustion-chamber when the damper m is opened.

The advantages claimed for my improved furnace are that all the apartments may be quickly heated from a single furnace, that it is not affected by changes in the direction of the wind, and that its peculiar construction effects a great saving of fuel.

Having thus fully described my invention, I claim as new and desire to secure by Letters Patent—

1. In a heating-furnace, the combination, with the fire-pot, combustion-chamber, the smoke and hot air pipes, and the air-chamber under the ash-pit, of an air-conduit inclosing the smoke-pipe of the furnace communicating with the air-chamber under the ash-pit, separate and independent air-conduits leading from the air space under the ash-pit through the combustion-chamber from its outer side at different points and into the ends of the hot-air distributing pipes, whereby the air receives its first increment of heat from the smoke-pipe, its second increment from the chamber under the ash-pit, and is finally heated by the pipes extending through the combustion-chamber and delivered in separate columns to separate distributing-pipes, substantially as specified.

2. In a heating-furnace, the combination, with the fire-pot A, combustion-chamber E, and the air-supply chamber J, of the separate and independent conduits I outside of the ash-pit and connecting the chamber J with the fire-pot through its sides, the pipes F, extending from the conduits on the inner sides of the fire-pot up through and out of the combustion-chamber, and the casing H, provided with the ducts K, into which the outer ends of the pipes project, substantially as set forth.

3. In a heating-furnace, the combination of the fire-pot A, combustion-chamber E, the looped air-pipes F, entering the fire-pot A and extending through the top of the combustion-chamber, the conduits I, communicating with the pipes F and adapted to receive the air-supply to the furnace, the air-chamber H, inclosing the fire-pot and combustion-chamber, and provided with the ducts K, surrounding the ends of the pipes F, and the dampers c, inserted in the ducts K, substantially as described.

4. The combination, with the air-trunk section L, of the smoke-pipe g, passing horizontally through the trunk, the vertical branch pipes d d', the damper h, interposed between the pipes d d', the horizontal pipe e, connecting the lower ends of the pipes d d' and extending beyond the sides of the trunk-section L, and the water-tank i, adapted to inclose the lower ends of the branch pipes d d' and the horizontal pipe e, substantially as described.

5. In a heating-furnace, the combination of the ash-pit C, fire-pot A, combustion-chamber E, the looped air-pipes F, entering the fire-pot and extending through the top of the combustion-chamber, the air-conduits I, the air-chamber H, the air-ducts K, provided with dampers c and surrounding the ends of the hot-air pipes F, the cold-air trunk L, communicating with the conduits I and chamber H, the smoke-pipe g, extending horizontally through the air-trunk L and provided with the damper h, the horizontal pipe e, connecting the pipes d d', extending through the sides of the trunk L and provided with the caps f, and the water-vessel i, inclosing the lower ends of the pipes d d' and the horizontal pipe e, substantially as described.

JAMES WHITE.

Witnesses:
J. R. DAVENPORT,
R. A. LINDSAY.